(12) United States Patent
Hawkins et al.

(10) Patent No.: US 12,062,487 B2
(45) Date of Patent: Aug. 13, 2024

(54) APPLIED ROTATIONS OF ANISOTROPIC HOMOPOLAR MAGNETIC DOMAINS

(71) Applicant: Smokey Hawk Solitons, LLC, Lewes, DE (US)

(72) Inventors: Thomas Hunt Hawkins, Hudson, OH (US); David Hawkins, Louisa, VA (US)

(73) Assignee: SMOKEY HAWK SOLITONS, LLC, Lewes, DE (US)

( * ) Notice: Subject to any disclaimer, the term of this patent is extended or adjusted under 35 U.S.C. 154(b) by 0 days.

(21) Appl. No.: 18/115,719

(22) Filed: Feb. 28, 2023

(65) Prior Publication Data

US 2024/0055169 A1    Feb. 15, 2024

Related U.S. Application Data

(62) Division of application No. 16/705,938, filed on Dec. 6, 2019, now Pat. No. 11,646,142.

(60) Provisional application No. 62/776,525, filed on Dec. 7, 2018.

(51) Int. Cl.
  *H01F 7/20*    (2006.01)
  *B64G 1/40*    (2006.01)
  *H01F 7/02*    (2006.01)

(52) U.S. Cl.
  CPC ............. *H01F 7/202* (2013.01); *B64G 1/405* (2013.01); *H01F 7/0273* (2013.01)

(58) Field of Classification Search
  CPC .................................................. H02K 1/22–27
  See application file for complete search history.

(56) References Cited

U.S. PATENT DOCUMENTS

| | | | |
|---|---|---|---|
| 7,106,764 B1 * | 9/2006 | Weingarten | H01S 3/1118 372/18 |
| 2003/0209635 A1 | 11/2003 | St. Clair | |
| 2020/0194156 A1 | 1/2020 | Hawkins et al. | |

FOREIGN PATENT DOCUMENTS

| | | |
|---|---|---|
| DE | 102016224816 A1 | 6/2018 |
| RU | 2208273 C1 | 7/2003 |
| WO | 2020118186 A1 | 6/2020 |

OTHER PUBLICATIONS

Non-Final Office Action dated Jun. 21, 2022 for U.S. Appl. No. 16/705,938, filed Dec. 6, 2019, 22 pages.

(Continued)

*Primary Examiner* — Arun Goyal
*Assistant Examiner* — William L Breazeal
(74) *Attorney, Agent, or Firm* — POLSINELLI LLP

(57) ABSTRACT

This application describes creating, modifying, and bending electromagnetic solitons at large scales for the various applications. An electromagnetic soliton generator system controls the magnetic soliton such that the orientation, rotation rate, pitch angle, and magnetic field strength of the solitons are modified to provide the described standing waves and generate a magnetic flux differential.

3 Claims, 14 Drawing Sheets

(56) References Cited

OTHER PUBLICATIONS

Tipler, "Physics for Scientists and Engineers" (Fifth Edition Year: 2004), pp. 247, 252, and 253.
PCT/US2019/064941, International Search Report and Written Opinion, mailed Apr. 15, 2020, 15 pages.
Malomed et al., "Spatiotemporal optical solitons", Institute of Physics Publishing, 7, 2005, R53-R72.
"Conservation of momentum", Internet Citation, Jan. 1, 2007 (Jan. 1, 2007), p. 1, XP002447082, Retrieved from the Internet: URL:http://www.britannica.com/eb/article-9053290 [retrieved on Sep. 3, 2007] the whole document.
Notice of Allowance for U.S. Appl. No. 16/705,938, filed Dec. 6, 2019, dated Jan. 11, 2023, 10 pages.

\* cited by examiner

APPLIED ROTATIONS OF ANISOTROPIC HOMOPOLAR MAGNETIC DOMAINS

CROSS-REFERENCE TO RELATED APPLICATIONS

This application is a divisional of U.S. application Ser. No. 16/705,938 filed Dec. 6, 2019, which claims priority to U.S. Provisional Patent Application No. 62/776,525 filed Dec. 7, 2018. Each of the aforementioned applications are incorporated herein by reference in their entirety for all purposes.

TECHNICAL FIELD

This disclosure relates generally to generating an anisotropic homopolar magnetic field by applying rotations to two or more electromagnetic blades and more specifically to propulsion and transmission of an electromagnetic soliton using electromagnetic pressure imbalances.

BACKGROUND

Advances in propulsion are what brought many of the modern era technologies to the forefront of daily use. The widespread use of airplanes, ships, submarines, and rockets to transport longer distances at increasing speeds has brought about efficiencies in engines, wing technology, and the like. However, to cope with the long-term challenges of high-speed transport, advancements beyond these limited technologies is needed.

SUMMARY

In one example, an electromagnetic soliton generator has two or more electromagnetic blades that each generate an electromagnetic field. The electromagnetic soliton generation includes a prime mover (e.g., any type of engine or reactor). The prime mover is connected to a shaft that couples the prime mover to the electromagnetic blades, in one arrangement, the shaft has two ends with two or more electromagnetic blades connected to the shaft. An exemplary arrangement of blades includes having multiple electromagnetic blades distributed in equal angular distance about the shaft. The electromagnetic blades are coupled to the shaft at a distance between the first end and the second end. In an embodiment with multiple sets of blades (e.g., multiple rows of blades), the sets of blades are connected to the shaft at various positions along the longitudinal axis of the shaft (e.g., the axis between the first end and the second end).

In another example, an electromagnetic soliton is generated. The process of generating an electromagnetic soliton includes generating a blade electromagnetic field by an electromagnetic blade connected to a shaft. The electromagnetic soliton generator moves the blade electromagnetic field by rotating the electromagnetic blade about an axis of the shaft. The electromagnetic soliton generator forms a self-reinforcing, standing wave of electromagnetic energy by the movement of the blade electromagnetic field.

These illustrative embodiments are mentioned not to limit or define the disclosure, but to provide examples to aid understanding thereof, Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

Figure 1:
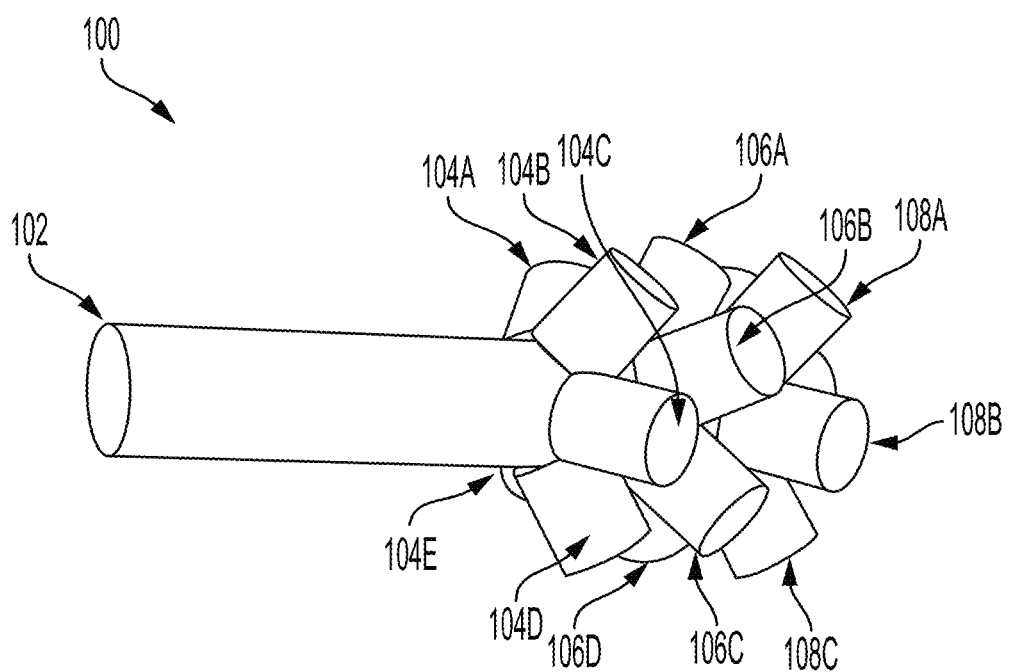
FIG. 1 depicts an embodiment of an electromagnetic soliton generator system, according to aspects of the present disclosure.

The patent or application file contains at least one drawing executed in color, Copies of this patent or patent application publication with color drawing(s) will be provided by the Office upon request and payment of the necessary fee.

DETAILED DESCRIPTION

Disclosed solutions relate to propulsion and transmission of an electromagnetic soliton using electromagnetic pressure imbalances. A soliton is a self-reinforcing, standing wave of electromagnetic energy. In particular, disclosed solutions relate to generating and deforming electromagnetic solitons for generating propulsion using homopolar electromagnetic fields.

The Archimedes' screw was originally able to move water up against the force of gravity. The design of the Archimedes' screw was modified in the late 1830s to propel ships without requiring wind power through the sails. The rotation of the ship's screw blades causes a local fluid pressure differential across each blade that drives small quantities of fluid motion in a perpendicular direction with respect to the blade motion. The overall motion of the fluid contains small quantities of fluid with variable vector directions, but the net direction of the overall motion of the fluid is perpendicular to the rotation of the screw. The net motion of the fluid provides for forward motion of the ship through the water. A similar analysis applies to airplane propellers generating small quantities of motion in an air mass.

From an observer perspective, the screw/propeller type rotation described above is detectable as standing waves in both water and air media. The standing waves observed in the water or air media do not mean that particles of the media (a water molecule or small quantity of the air mass) are fully travelling the detected distances. Instead, the pressure imbalances created by the high-power screw/propeller type rotation are likely best understood by the frequency and amplitude of the standing waves in the media. Performing classification based on the frequency and amplitude of the standing waves forms the basis for the capability for sound navigation and ranging analysis of detected acoustic waves. While various algorithms are implemented to determine a propulsion source (e.g., a particular engine or screw), the principles of detection based on frequency analysis has been widely researched. For instance, a frequency classification and amplitude classification generally lead to an accurate estimate of direction of motion/source type of both waterborne and airborne platforms (e.g., two four-bladed screws, a single two-bladed screw, etc.).

In the 1880s A. A. Michelson examined the measurement of the speed of light to determine if the "nether" existed. Without judging whether this is true or not, we can infer from the results that light has a physical speed associated with it. It is also assumed that this speed is well-characterized at approximately $3*10^8$ mils.

In other research, H. Nyquist was able to generate transfer functions that solved intersymbol interference (ISI) by effectively isolating signals from noise by assuming that "at every sampling instant, the response due to all symbols except the current symbol is equal to zero." In the most gross form, this implies a filter of and defines how to sample a discrete wavefunction.

Conventional AC/DC motor-generator conversion systems use a configuration of rotor with integral field windings and stator with associated windings for the conversion of AC to DC or DC to AC at various power levels. This allows for transfer of energy type from electrical to mechanical to electrical using electromagnetic fields, high power levels on either end, with the understanding that some magnetic, mechanical and thermal losses will be present. However, it represents a very reliable system. In the generation of a DC magnetic field, DC is applied to the rotor using slip rings and a split-ring commutator. The DC is applied to field windings on the rotor, which allow a polarity reversal on the windings in order to provide a near-constant field for interaction with the rotating AC magnetic field. This is a basic motor principle, that can also be reversed for electrical power generation. In configuration of these windings, it is typical to provide a consistent field at the rotor winding direction.

In the 1950s, T. H. R. Skyrme proposed a new model of the interior of a nucleus of an atom. Since it is known that the atomic configuration is made of protons and electrons at a basic level, the Skyrmion shows certain structures that can be used for propagating along electric fields within microcomputer logic circuitry and are well-characterized in the ability of movement and detection within the electric field.

However, none of the approaches described above however, are capable to create (e.g., for propulsion) or detect (e.g., for classification) standing electromagnetic waves for a vehicle propelled by an electromagnetic pressure imbalance.

In the Bohr model, there are quantum nu fibers associated with specific electron orbits and these are equivalent to the energy absorbed or released. There is a good association with the Ry berg equations which show the color spectrum of light emitted. The Bohr model is an excellent model of the atomic structures that allow understanding of the interactions of electron energy across energy transfer domains.

However, the Bohr model does not address the relative motion of the nucleus and the unknown bindings between the electron energy transfer and the overall system motion. The famous Michelson-Morley experiment series in 1887 showed the ability to calculate and measure the speed of light propagation.

The system of equations discussed by F. Schrodinger showed that all the electromagnetic energies are interconnected. The wave functions of the electron location determine the response of the electron at, various frequencies. Given what is currently known about the $mc^2$ term, the present disclosure describes the harmonics associated with the wave functions, Wave harmonics would assist in discerning how acoustic, thermal, visual, ultraviolet, and high energy radiations interact with matter at a fundamental level. These types of energies are associated with respective transmission frequencies and the atomic/electron densities. The definition of photons includes characteristic properties of waves, including both frequency and wavelength. Given the standard practice of describing magnetic field lines as interactions with positive charges, the directionality of the simulation results has been continued in the present disclosure. The operations of the system and methods disclosed herein within significantly higher frequency magnetic fields may interact with photons on a more fundamental level within a half-wavelength.

The present disclosure describes relaxation of the local fields within the metal as short, ideally within the timeframe of the initial field rotations. The short time durations mean that an individual field, as it rotates, self-interacts with a remnant field that has yet to change. The self-interaction is not a significant effect for low magnetic fields but must be considered for high energy magnetic fields with specific metals (e.g., for manufacturing requirements).

Accordingly, the present disclosure describes embodiments such that the magnetic field within the shielding can be confined at relatively high densities without negative effects and the confinement allows the application to continue without concerns for shield temperature increase.

Magnetics introductory courses generally teach that magnets are unique in that they are always bipolar in nature. Accordingly, conventional magnetics teach that devices cannot split magnetite or ferromagnetic material into a separate north and south pole as compared to the way a device can separate electric charge into positive and negative charges.

Contrary to conventional understanding of magnetics, the disclosure provided herein shows that arrangements of magnetic structures with a multi-arm homopolar design generates a magnetic soliton formation at scales that provide utility for propulsion and directional control. The resultant magnetic forces between electromagnetic blades described by the methods and systems herein can be observed by arrangement of magnets or solenoidal blades. The systems and methods described herein show that the magnetic forces between electromagnetic blades can be appropriately arranged to demonstrate controllable motion.

Ampere's Law states "The sum of the length elements times the magnetic field in the direction of that length for any closed-loop path is equal to the product of the permeability of the medium and the current through the conductor," This law is commonly used for calculating the internal field of a solenoid core. However, in the present disclosure, the method and systems disclose modifying the solutions of Ampere's Law to find the external fields of coupled solenoids and/or magnetic cores aligned as in a set of coupled solenoids. Embodiments of the present disclosure relate to a homopolar combination of magnetic fields and determining the magnetic fields' interactions within the spaces between neighboring coupled solenoids at various angles.

Embodiments of the present disclosure incorporate the Finite Element Model initial experimental testing involved placing a magnet or ferrous material in the vicinity of the homopolar soliton configuration and oscillating the magnet or ferrous material to various positions around the homopolar soliton configuration. Performing this initial experiment allowed the inventors to "feel" the rise and fall of the magnetic field strength in proximity to the blade locations. These patterns were observed through an observation of the response pattern of ferromagnetic iron filings. An external coupled solenoidal representation as described herein defines the actual "blade" of an electromagnetic blade.

The systems and methods described herein raise the inherent energy levels of the local frequencies in any given propagation direction. Therefore, $f_s$ may vary from explicit values disclosed herein based on specific design considerations of an electromagnetic propeller.

In contrast with conventional generator systems, two fundamental differences exist between the presently disclosed systems and a typical DC armature. First, the armature lengths are elongated in the present disclosure that allows field interactions to occur in positions other than merely between the armature and a stator. This lowers the magnetic field along the external length of a single solenoid, but not in certain coupled armature designs. In an example, the field interactions occur between armatures. The second is a homopolar design. A conventional DC armature typically has an alternating magnetic field shape (non-homopolar).

Independent controllable propulsion at high-power outputs should be possible by manipulating lines of magnetic force by using a homopolar, asymmetric, magnetic soliton generator. Variable power is achieved by simultaneous control of angular velocity, pitch angle of asymmetry, and magnetic field strength.

The present disclosure describes creating, modifying, and bending magnetic solitons at large scales for the various disclosed applications. An embodiment of the present disclosure controls the magnetic soliton such that the orientation, rotation rate, pitch angle, and magnetic field strength of the solitons are modified to provide the described standing waves and the capability electromagnetic propulsion.

As embodiments of the present invention relate to propulsion using electromagnetic means, propulsion of a vehicle in a vacuum (e.g., space) environment should be possible by taking advantage of a diverse set of physical phenomena combined into an electromagnetic propelled vehicle. Previous approaches, such as in magnetohydrodynamics, attempts were made to create a flow of ionic plasmas or near-plasmas without motion input required. Considering the electromagnetic responses of the tether experiments in the 1990s which used an excessive length of wire to generate significant forces and current. In contrast to previously attempts, the disclosed method herein takes a reverse approach to describe a direct drive application of motion combined with the electromagnetic principles disclosed herein and a geometry type which can accelerate photonic elements at various wavelengths.

The electromagnetic soliton generator system generates the necessary magnetic pressure differential by the positioning the blades such that magnetic field between the blades is compressed between the blades due to the unique coupling behavior. This field line compression followed b the rotation generates the magnetic soliton due to the unique coupled field line distribution in a single row or set of rows.

Since a tip of a first blade and a tip of a second blade are of the same polarity (i.e., the blades are in a homopolar configuration), the magnetic force at the tips of the blades tend to "push" or repel the other blade. Computationally, it is difficult to determine a quantitative value for the force between the first blade and the second blade, but such a repelling force exists by testing and basic measurements. This effect theoretically extends beyond the tip of the blade to an infinite distance. The electromagnetic soliton generator system reduces the infinite distance intrinsically by imposing the coupling, which ensures that the conformity to Maxwell's equations is maintained. Additionally, the electromagnetic soliton generator system applied a forced rotation. As the electromagnetic soliton generator system reduces the infinite distance, the repelling force is increased.

The application of high-power solenoidal electromagnets presents practical electrical power engineering challenges in an example that has no rate of rotation applied. The disclosed method lowers the necessary electrical power requirement for the solenoidal electromagnets but does not eliminate the challenge. The overall power is still required and is now provided in a manner that is within a kinetic reference frame, as opposed to a different energy level (e.g. combustion frame, an electromagnetic frame, a thermal frame, or acoustic frames). The electromagnetic solution generator system provides the bulk of the energy in the form of kinetic energy (rotation) and accordingly there is less energetic loss at the higher frequencies (e.g., associated with an electric force, or associated with a purely static superconducting magnet). The electromagnetic solution generator system transfers a substantial portion of the energy directly in the kinetic reference frame (e.g., speed of rotation).

As used herein, the term "electromagnetic soliton" is used to refer to a self-reinforcing, standing wave of electromagnetic energy.

Referring now to the drawings, FIG. 1 depicts an embodiment of an electromagnetic soliton generator system, according to certain embodiments of the present disclosure. For instance, an electromagnetic soliton generator system 100 has a shaft 102, and various rows of electromagnetic blades 104A-104E, 106A-106E 108A 108E, hereinafter "electromagnetic blades 104, 106, and 108". The electromagnetic soliton generator system 100 tither includes a prime mover (e.g., an electric motor, a fuel-based engine, etc.) and may be attached to any type of vehicle or vessel (e.g., car, aircraft, all-terrain craft, etc.) that are not shown in FIG. 1. The electromagnetic soliton generator system 100 produces a magnetic soliton to generate a magnetic pressure differential that can be applied to create a motion in a vehicle.

In an embodiment, the electromagnetic soliton generator system 100 has a shaft 102. The shaft 102 has an axis of rotational symmetry, hereinafter "shaft axis" that defines a first end of the shaft 102 and a second end of the shaft 102. The shaft 102 is a non-ferrous material (e.g., copper, steel, aluminum, brass, carbon fiber, acrylonitrile butadiene styrene (ABS) or similar polymer, wood, etc.). The electromagnetic soliton generator system 100 has a first row of blades 104A-104E attached along the shaft 102, Each electromagnetic blade 104A-104E has a mounting position (not referenced) at which the respective electromagnetic blade 104A-104E is attached to the shaft 102. In some embodiments, the mounting position is a tapped opening in the shaft 102 such that the electromagnetic blade 104A-104E can be attached using a mechanical screw-type connection.

In other embodiments, the electromagnetics blades 104A-104E can be welded, or attached by other mechanical means such as brackets, rivets, or similar methods. The electromagnetic blades may be magnetized Neodymium (or other ferromagnetic material), or an electromagnetic solenoid. For example, each electromagnetic blade may have multiple Neodymium ring magnets.

While FIG. 1 is described with reference to the first row of blades 104A-104E, a similar explanation applies to the second row (106A-106E) and the third row (108A-108E) of electromagnetic blades.

The shaft 102 has various rows of electromagnetic blades that may be grouped by distance from the first end of the shaft 102 along the axis of shaft 102, In FIG. 1, the rows of electromagnetic blades are 104A-104E, hereinafter the "first row", 106A-106E, hereinafter the "second row", and 108A-108E hereinafter the "third row." A particular row is defined as having the same distance from the first end of the shaft 102 to the mounting points of the electromagnetic blades 104, 106, 108 in the row. In other words, the electromagnetic blades 104A-104E have mounting points on the shaft 102 the same linear distance from the first end of the shaft 102.

In some cases, the electromagnetic soliton generator system 100 disposes the electromagnetic blades with a pitch angle, which is further described and best understood with regard to FIG. 4. Each electromagnetic blade 104A-104E, 106A 106E, and 108A 108E has an axis that runs from the shaft axis through the center of the respective electromagnetic blade, hereinafter a "blade axis," A pitch angle of each electromagnetic blade is an angular distance between the shaft axis and the blade axis. Each of electromagnetic blades 104, 106 and 108 creates an individual magnetic field, hereinafter a "blade field," The arrangement of the electromagnetic blades 104, 106, and 108 is such that the directionality of the blade fields is oriented in a homopolar configuration, A homopolar configuration orients the directionality of a combination of the coupled individual magnetic fields such that the same pole (e.g., South pole, North pole) directed inwards towards the shaft 102. The homopolar configuration is likely best understood with regard to FIG. 2 or FIG. 3. The electromagnetic soliton generator system 100 rotates that shaft 102 and the attached electromagnetic blades 104, 106, 108 so that each blade field interacts with the ambient radiation. The electromagnetic blades 104, 106, and 108 generate a magnetic low pressure that results in a motive force.

A stationary combination of the individual magnetic fields in a planar homopolar configuration does not create the soliton described herein without additional input. The electromagnetic soliton generator system 100 applies a rotational motion around the axis of shaft 102 that physically moves the electromagnetic blades (and accordingly the electromagnetic blade fields) with a rotational velocity in the soliton plane. The rotational velocity of the electromagnetic blades (and accordingly the magnetic field lines) is constant within the reference frame of the field arrangement. An example of a reference frame of the field arrangement is a soliton plane with an α=0. To an observer in an external reference frame, the fields have the apparent effect of a continuously variable magnetic field in the constant "inward" or "outward" direction as compared to the center of rotation which approximates a magnetic soliton. The form of the magnetic soliton disclosed herein may be represented as or analogous to a large scale skyrmion.

In a non-limiting example, the rate of rotation of the electromagnetic blades is in a range of approximately 5,000 RPM and 30,000 RPM. In the example case, the rates of rotation of the electromagnetic blades may be represented as a rotational frequency of approximately 83-500 Hz. For a stationary point in the soliton plane, the blade frequency represents the frequency that an axis along the length of a blade passes through the stationary point for the five-blade example is approximately 415 Hz-2.5 kHz.

The electromagnetic soliton generator system interacts with all traveling energy less than the specific frequency in either (magnetic or electric) form, leading to energy potentials of approximately $9.93*10^{-20}*f_s^2$ J. In this equation, $f_s$ represents the blade frequency indicating the frequency at which an axis along the length of a blade passes through a stationary point. The $9.93*10^{-20}$ represents an integral of energy from a frequency value of 0 to $f_s$. The above equation represents the expected amount of energy available per $f_s$ at any given region in space, without considering photon density. Without assuming nominal solar photonic density across different frequencies, it is expected that up to $5*10^{-13}$ J is available to transfer to individual photons. In this equation, the term f s may be represented by $$f_s = \sqrt{\frac{P_{exc}*745.7}{9.93*10^{-20}}},$$

where $P_{exc}$ is excess power of the electromagnetic soliton generator system. This also allows us to directly relate the excess power concept to photons. Therefore, we evaluate the power required for direct rotation, and calculate the available torque from the prime mover to find the available power to accelerate photons. As the electromagnetic blade passes a point in space, it deflects a photon according to Lorentz force associated with the specific half-wavelength of the photon. By extension, the same principle applies to multiple photons, including photons at frequencies less than the square of the electromagnetic blade frequency $f_s^2$. A rapid rise of a local magnetic field strength at a point in space (e.g., closer proximity to an electromagnetic blade) produces a changing Lorentz force ahead of the electromagnetic blade moving through the point in space. The rapid rise in local magnetic field strength occurs based on the $f_s$ frequency, the distance from the rotational axis, and proximity to the electromagnetic blade.

Total power conservation in the system means that conversion of the prime mover power and the anisotropic magnetic field energy (e.g., the permanent magnetic imbalance) in a rotating system will be thermal loss, rotational motion of the electromagnetic blades and horizontal shaft, and soliton field motions. The soliton field motions are described elsewhere herein.

The electromagnetic soliton generator system configures the electromagnetic blades to manipulate a local average magnetic field responsive to an input from an operator of the electromagnetic soliton generator system or an automated optimization process.

A simplified example to provide an analogy of the electromagnetic concept described is a turbojet engine and an airmass medium. The turbojet engine intakes a local gaseous medium at various densities and contains internal devices to shape that local density pattern, create flow, and a reaction with a local environment. The internal devices of the turbojet engine include shaped and moving metal. These devices capture and reposition a density gradient of a specific medium (air, in this analogous description) and then causes a reaction with the local environment that results in motion. The present disclosure provides a device of shaped metal that captures and acts as a compressor for various frequencies of magnetic fields directing the flux lines in specific directions to the vicinity of the electromagnetic propeller. As the electromagnetic soliton generator system establishes motion of the vehicle, the direction may change between the figures below.

Figure 2:
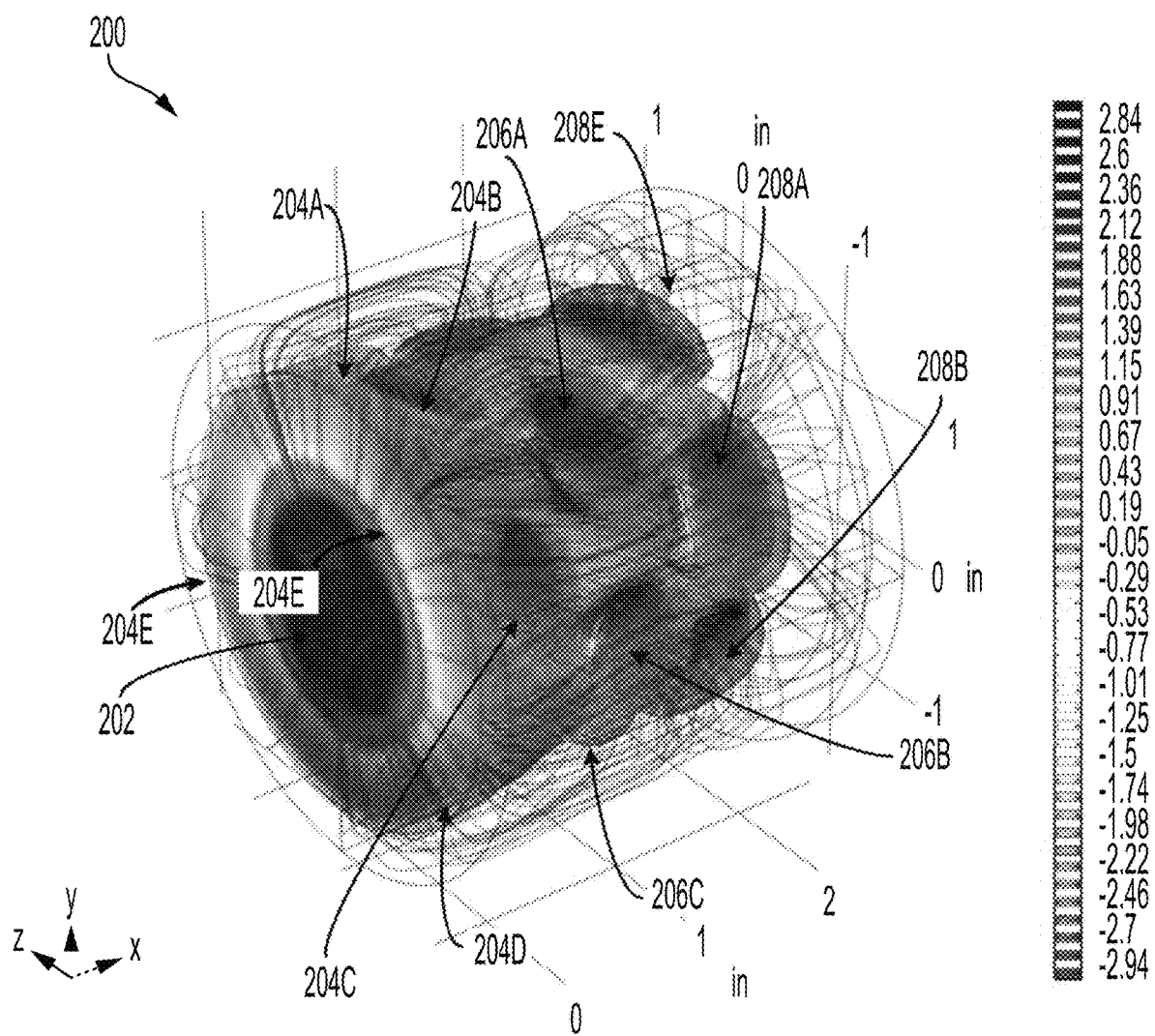
FIG. 2 depicts a visualization of magnetic flux density of an electromagnetic soliton generator system, according to aspects of the present disclosure.

FIG. 2 depicts a visualization of magnetic flux density of an electromagnetic soliton generator system, according to certain embodiments of the present disclosure. The electromagnetic soliton generator system 100 has various electromagnetic blades 104, 106 and 108 that each generate a blade field. While the electromagnetic blades 104, 106, and 108 are not depicted in FIG. 2, the blade fields 204A-204E.

For instance, the electromagnetic soliton generator system 100 exhibits a homopolar configuration due to the arrangement of the electromagnetic blades 104, 106, and 108, The electromagnetic soliton generator system 100 generates a soliton core 202 and blade fields 204A-204E. The electromagnetic blades 104, 106, and 108 generate blade fields such that the same pole for each of the electromagnetic blades 104, 106 and 108 (i.e., North/South) is located in the vicinity the shaft 102. The electromagnetic soliton generator system 100 concentrates the magnetic field lines (depicted as red lines in FIG. 2). The magnetic field lines are concentrated because of the homopolar (e.g., each pole repels the other poles) at the mounting points of the shaft 102. In other words, the same pole (North/South) is located at the mounting point of each electromagnetic blade 104, 106, 108. The resulting concentration of North or South poles compresses the field lines into a densely repulsive magnetic field that is the soliton core 202 represented by the red central region of FIG. 2. The electromagnetic soliton generator system 100 arranges the electromagnetic blades 104, 106, 108 such that as the distance from the soliton core 202 increases, the blade fields 204A-204E decrease in field strength.

Figure 3A:
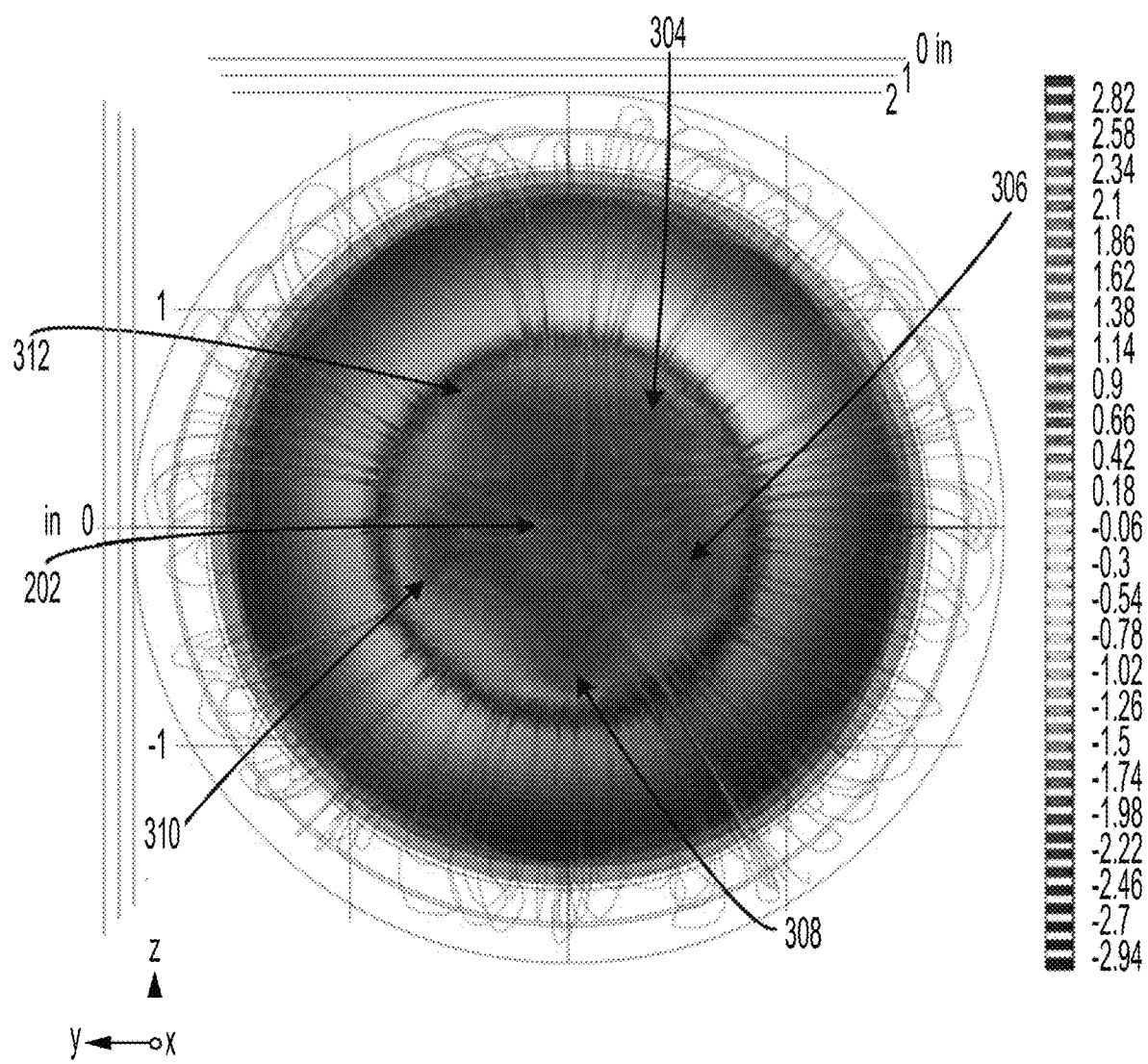
FIG. 3A depicts a sectional view of the shall and blade fields of an electromagnetic soliton generator system, according to aspects of the present disclosure.

The electromagnetic soliton generator system 100 compresses the field lines because the field lines between similar poles must not cross in order to satisfy continuity of field lines, FIG. 3A depicts a sectional view of the shaft and blade fields of an electromagnetic soliton generator system, according to certain embodiments of the present disclosure. The sectional view of FIG. 3A is oriented such that the shaft axis runs into and out of the page. In this sectional view, the magnetic flux density is being viewed from the first end of the shaft 102. Accordingly, the electromagnetic blades 104, 106, and 108 are at an angle corresponding to a with respect to the normal to the page.

In an embodiment, the electromagnetic soliton generator system 100 generates a core 202 and various sub-core regions 304, 306, 308, 310, and 312. An example of a sub-core region is a sub-region of the core that contains compressed magnetic field lines localized between two electromagnetic blades (not depicted). The sub-core regions 304, 306, 308, 310, and 312 are depicted as the areas with magnetic flux densities of 1.86 and above. These values described herein are material specific and could be different for differing configurations without departing from the teaching of the present disclosure. While the magnetic flux densities are described with specific values, it will be appreciated by one of skill in the art that choice of material can change these values without departing from the teaching of the disclosure. While not depicted explicitly in FIG. 3A, for clarity sake, a row of electromagnetic blades can be visualized (FIG. 3 is a five blade configuration) as the groups of concentrated field lines extending from the core 202 towards the edges of FIG. 3A.

Figure 3B:
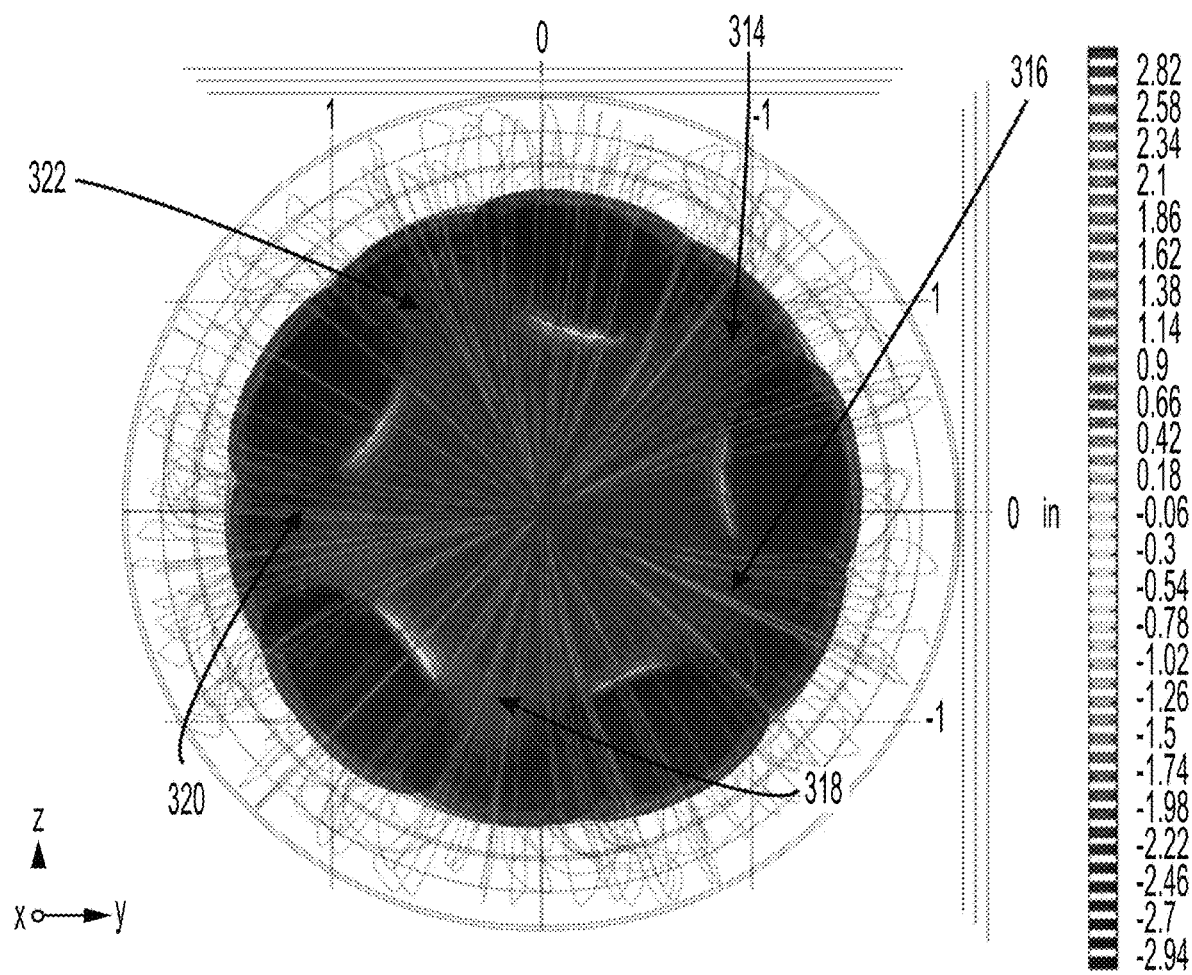
FIG. 3B depicts another sectional view of the shaft and blade fields of an electromagnetic soliton generator system, according to aspects of the present disclosure.

FIG. 3B depicts a sectional view of the shaft and blade fields of an electromagnetic soliton generator system, according to certain embodiments of the present disclosure. The sectional view of FIG. 3A is oriented such that the shaft axis runs into and out of the page. In the sectional view of FIG. 313, the magnetic flux is being viewed from the second end of the shaft 102. Accordingly, FIG. 3B stands as a rear view of the electromagnetic soliton generator system 100 from FIG. 3A. The magnitude of a positive magnetic flux density is a result of Gauss" Law of magnetism for the pitch angle.

The electromagnetic soliton generator system 100 generates anisotropic magnetic fields such that as compared with FIG. 3A that illustrates a strong homopolar magnetic flux density, FIG. 3B depicts relatively substantially equivalent magnitude, opposite polarity magnetic flux dens' Comparison of the relative magnitudes results in an overall system offset from a zero potential flux density, which represents the named magnetic flux density anisotropy (e.g. local maxima of ±2.5 and −1.5 result in an overall anisotropy of +1.0). The electromagnetic soliton generator system 100 creates a net magnetic anisotropy across the electromagnetic soliton generator system 100.

Figure 4A:
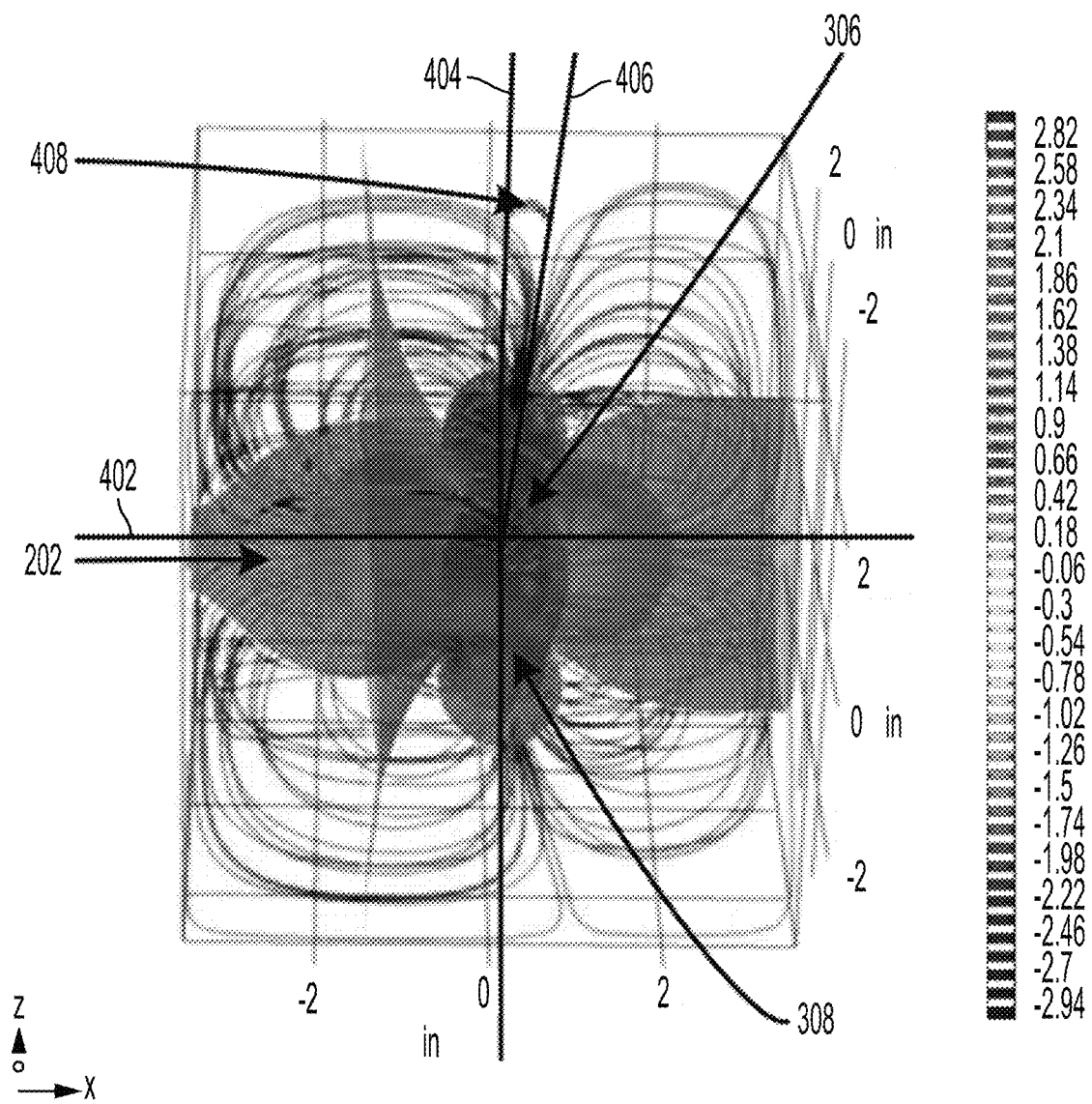
FIG. 4A depicts an example of an isometric view of the shaft and blade fields of an electromagnetic soliton generator system, according to aspects of the present disclosure.

FIG. 4A depicts an example of an isometric view of the shall and blade fields of an electromagnetic soliton generator system, according to certain embodiments of the present disclosure. The isometric view of FIG. 4A is oriented such that the shaft axis runs parallel to the page. In this isometric view, the magnetic flux is being viewed from a point in space external to the electromagnetic soliton generator system 100 at a position along the shaft axis such that the row of electromagnetic blades (FIG. 4A depicts a single row system) is the same distance as the point in space from the first end of the shaft 102 as the row of electromagnetic blades. For illustrative purposes, sub-core region 306 and sub-core region 308 are shown in perspective coming out of the page. The sub-core regions 304, 310 and 312 are disposed around the shaft 102 as described with regard to FIG. 3A, however, are at positions obscured by the shaft 102 in the isometric view of FIG. 4A.

In an embodiment, the electromagnetic soliton generator system 100 positions the electromagnetic blades at an angle relative to the blade axis or the shaft axis. The electromagnetic soliton generator system 100 deflects the blades at a pitch angle that is defined as "a" where alpha is the angle 408 measured between the blade axis 406 and a pitch reference axis 404. The pitch reference axis 404 is perpendicular to the shaft axis 402 and located at the same distance from the first end and the second end as the respective row of electromagnetic blades. The electromagnetic soliton generator system 100 may fix the pitch angle $\alpha$ at a fixed angle by method of construction or design constraint.

The electromagnetic soliton generator system 100 can vary the pitch angle 408 from [−90°+90°] relative to the pitch reference axis 404 where a positive deflection indicates the electromagnetic blades are deflected closer to the second end of the shaft axis 402. The electromagnetic soliton generator system 100 can vary the pitch angle based on rotation speed, length blade, blade loading, vehicle speed, or other factors. The unreferenced magnetic field lines (shown as red lines in FIG. 4) clearly illustrate a visual confirmation of the net anisotropy that characterizes the magnetic field. The net anisotropy is illustrated by a higher concentration of magnetic field lines on one side of the pitch reference axis 404. and a lower concentration of magnetic field lines on the opposing side of the pitch reference axis 404.

Figure 4B:
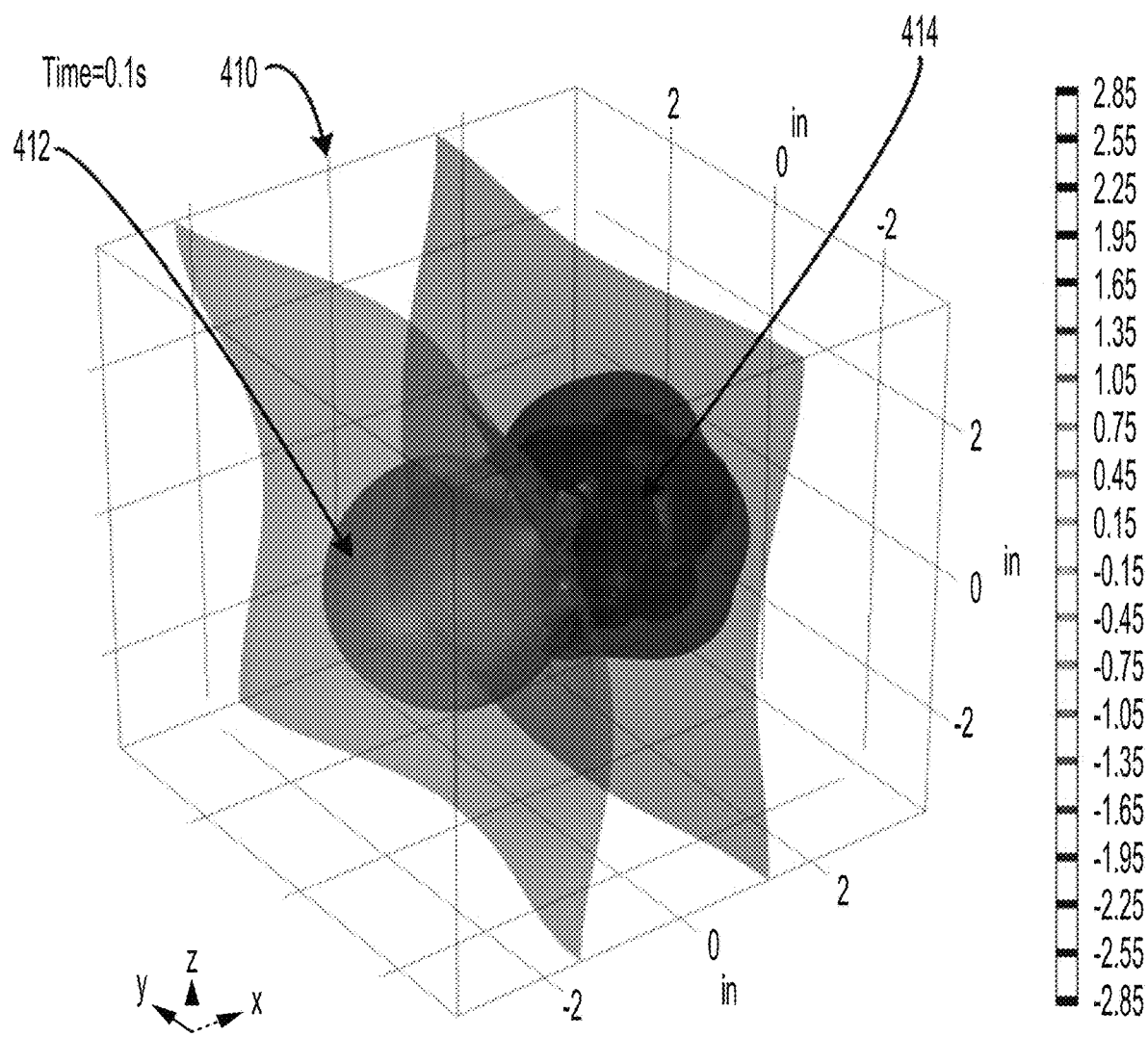
FIG. 4B depicts an electromagnetic soliton, according to aspects of the present disclosure.

FIG. 4B depicts an electromagnetic soliton, according to the present disclosure. An example of an electromagnetic soliton is a self-reinforcing, standing wave of electromagnetic enemy. The electromagnetic soliton generator system 100 produces an anisotropic electromagnetic soliton 410 with first lobe 412 and a second lobe 414. The electromagnetic soliton 410 demonstrates anisotropy as comparing the shapes of the first lobe 412 and the second lobe 414, The second lobe 414 is disposed at the first end of the shaft 102 and corresponds to FIG. 3A, The first lobe 412 is disposed at the second end of the shall 102 and corresponds to FIG. 3B. The shape of the first lobe 412 can be approximated by the Hedgehog equation $U(x)=\exp\{if(r)\hat{x}*\tau\}=\cos f(r)1+i*\sin f(r)\hat{x}*\tau$.

FIGS. 5A-D depict a series of visualizations of magnetic flux density as the electromagnetic soliton generator system rotates the shall, according to certain embodiments of the present disclosure. The series of visualizations of FIGS. 5A-D are oriented such that the shaft axis runs into and out of the page. In this series of visualizations, the magnetic flux density is being viewed from the first end of the shaft 102. Accordingly, the electromagnetic blades are at a pitch angle α with respect to the planar to the page. The pitch angle can be any angle bounded [−90, 90] from an angle perpendicular to the shaft 102, FIGS. 5A-5D depict the same configuration and the corresponding numerals have been maintained throughout the various views of the rotation for clarity.

Figure 5A:
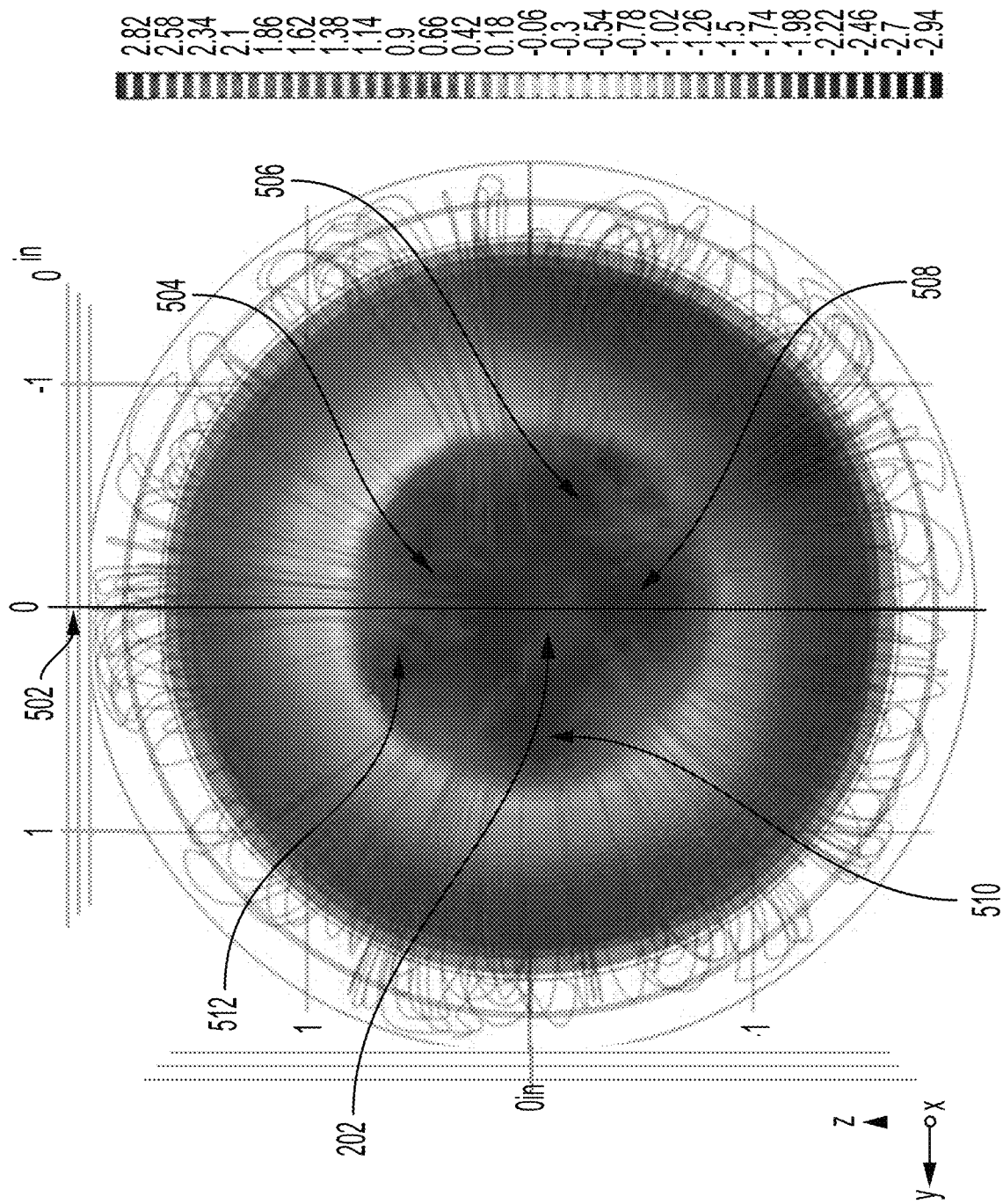
FIGS. 5A-D depict a series of visualizations of magnetic flux density as the electromagnetic soliton generator system rotates the shaft, according to certain embodiments of the present disclosure.
Figure 5B:
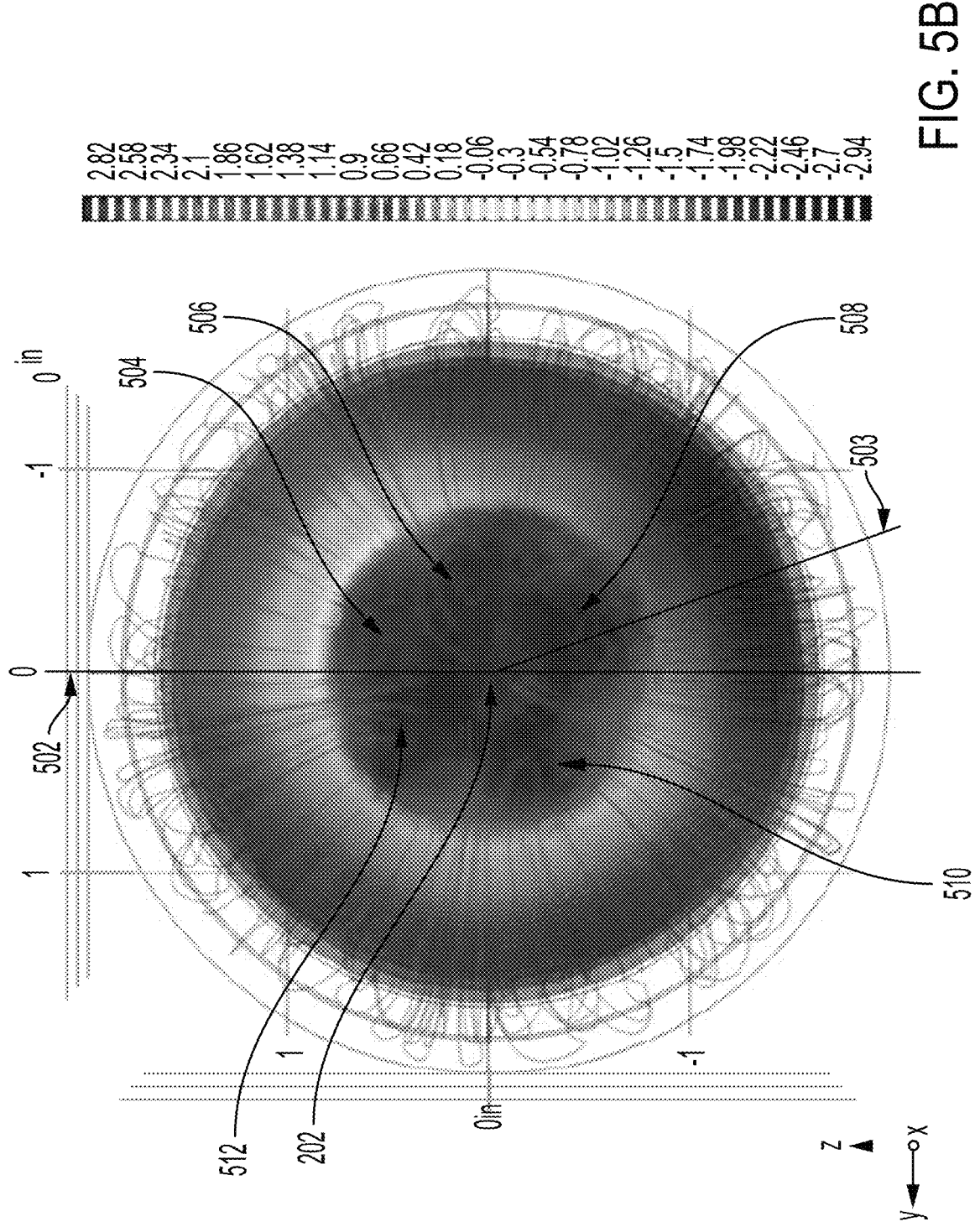
Figure 5C:
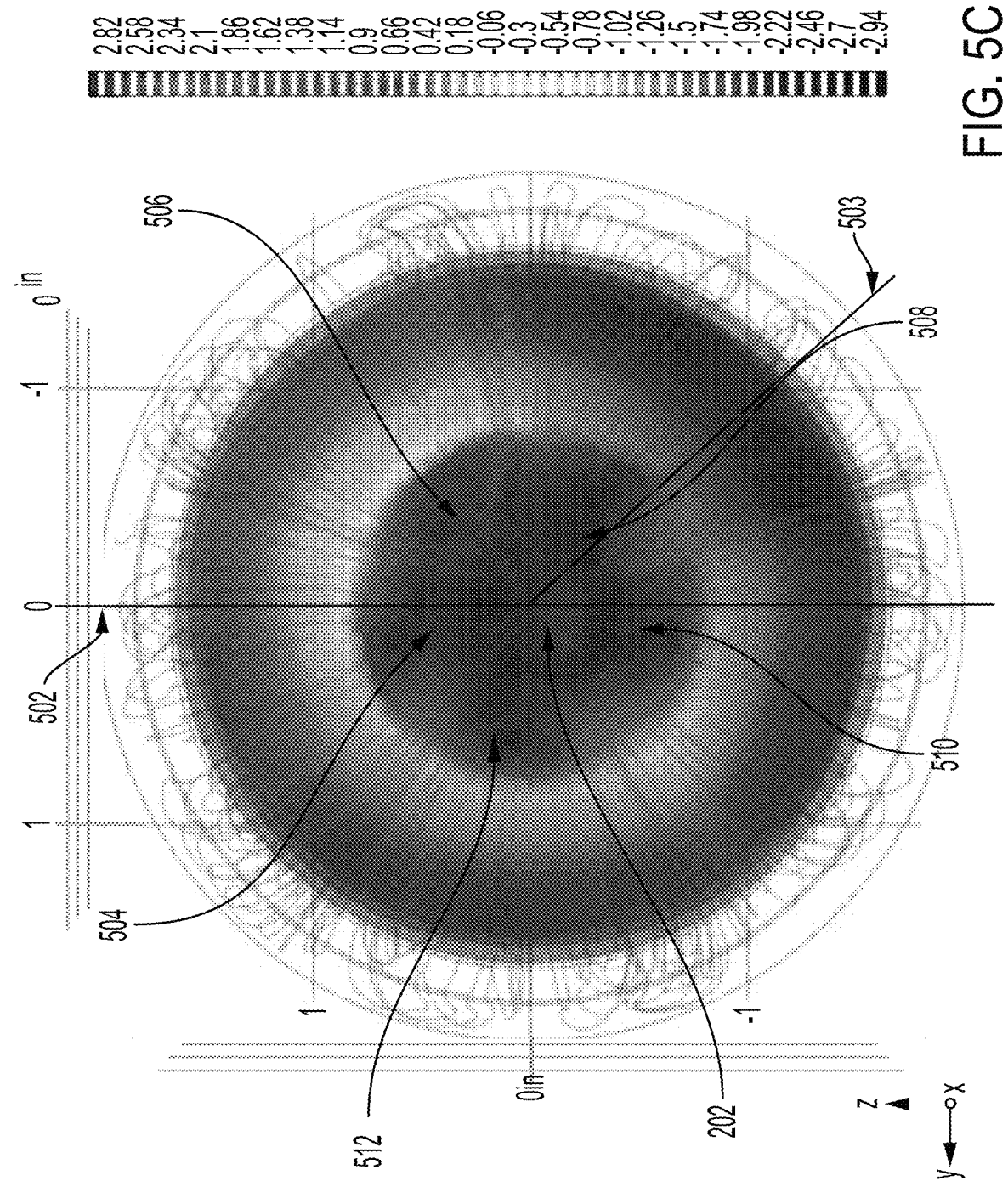
Figure 5D:
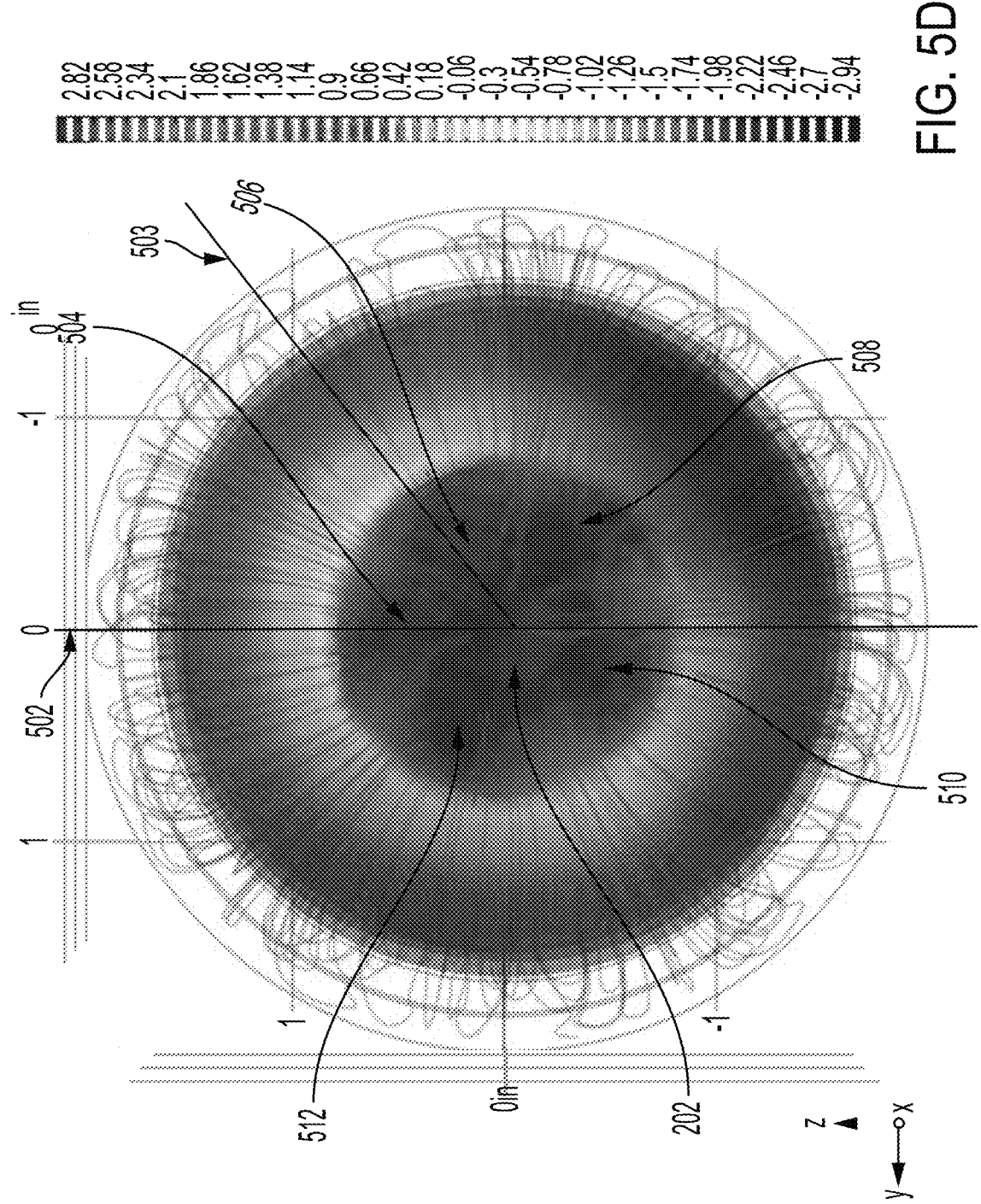

In an embodiment, the electromagnetic soliton generator system 100 generates a core 202 and various sub-core regions 504, 506, 508, 510, and 512. The sub-core regions 504, 506, 508, 510, and 512 are depicted as the areas with magnetic flux densities of 1.86 and greater. The electromagnetic soliton generator system 100 is shown with a vertical axis 502 and sub-core region tracking angle 503. In this example, the electromagnetic soliton generator system 100 determines that sub-core region tracking angle 503 tracks sub-core region 508. In FIG. 5A, the sub core region tracking angle 503 is collinear with vertical axis 502 and is thus not shown. At FIG. 5B, the subcore region tracking angle 503 has displaced from the vertical axis 502 to a position that tracks the movement of sub-core region 508. In FIG. 5B the electromagnetic soliton generator system 100 has displaced the shaft approximately 20° of rotation. At FIG. 5C, the subcore region tracking angle 503 has displaced from the vertical axis 502 to a position that tracks the movement of sub-core region 508 beyond the position shown in FIG. 5B. In FIG. 5C, the electromagnetic soliton generator system 100 has displaced the shaft approximately 60° of rotation. At FIG. 5D, the sub-core region tracking angle 503 has displaced from the vertical axis 502 to a position that tracks the movement of sub-core region 508 beyond the position shown in FIGS. 5B-C, In FIG. 5D, the electromagnetic soliton generator system 100 has displaced the shaft approximately 120° of rotation. In some cases, the electromagnetic soliton generator system 100 rotates the shall via a prime mover which can be a small electric motor, an internal combustion engine, a steam turbine, or other means of providing excess power for conversion into rotational motion. The prime mover can be connected directly to the electromagnetic soliton generator system 100 or alternatively connected via a suitable power transmission system (e.g. proper gear ratio for desired soliton output, drive belt system) to a prime mover.

Figure 6:
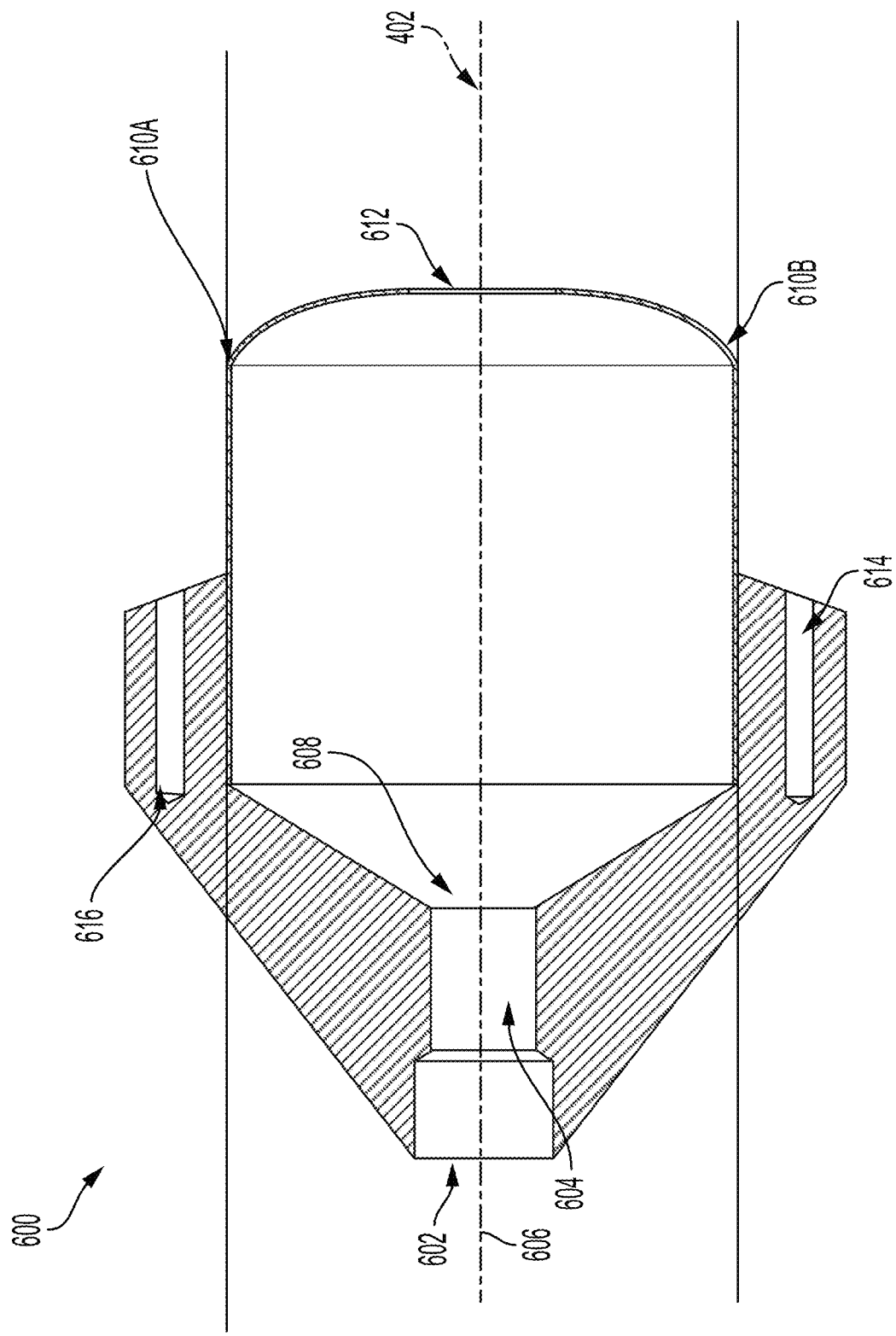
FIG. 6 depicts an example of a guide mechanism, according to aspects of the present disclosure

FIG. 6 depicts an example of an electromagnetic guide mechanism, according to the present disclosure, in some embodiments, an electromagnetic guide mechanism 600 is placed around the shaft 102, electromagnetic blades 1104, 106, and 108 as well as any additional rows of electromagnetic blades. The electromagnetic guide mechanism 600 may encompass any number of rows or blades, and dimensions can vary as needed to encompass shaft 102 and electromagnetic blades 104, 106, and 108. The guide mechanism 600 includes magnetic permeability guide sections and electric permittivity guide sections to adjust soliton propagation behavior. An example of the magnetic permeability guide section and electric permittivity guide section are respective material sections of the guide mechanism 600 with individual characteristics to control the magnetic permeability or electric permittivity. The exact values of magnetic permeability $\mu_r$ or electric permittivity $\varepsilon_r$ depend on configuration, however, exemplary values are $\mu_r>150{,}000$ and $\varepsilon_r<5$ with conductivity values $\sigma\geq 30{,}000$.

In an embodiment, the guide mechanism 600 comprises a shall mounting position 602 of a dimension based on the mounting of the shaft to the prime mover or reduction gear assembly. In some cases, the shaft mounting position 602 is the same dimension as the shaft guard region 604, The shaft guard region 604 is designed to accommodate the shaft 102 size with appropriate tolerances to account for vibration of the electromagnetic soliton generator system 100. The guide mechanism 600 has a leading edge 606 shaped with a leading edge angle 608. The leading edge angle 608 may be computed based on field line simulations in the region near the electromagnetic blades with regard to the shaft 102. In some cases, the leading edge 606 is computed for pitch angle 406 values between [0, 90] inclusive. In other examples, the leading edge 606 can be at angles other than the pitch angle 608. The guide mechanism 600 includes an axis 606 that is disposed from a first end of the guide mechanism to a second end of the guide mechanism and is located at the same position as the axis of shaft 102.

In an example, the guide mechanism 600 includes a guide enclosure which is a cylindrical shaped housing that contains the electromagnetic blades, such as electromagnetic blades 104, 106, and 108. In this example, a top edge 610A and a bottom edge 610B are parallel to the shaft axis 402. In other examples, the cylindrical shaped housing can be adjusted with a taper (i.e., a cone shape) and accordingly the top edge 610A and the bottom edge 610B me be converging or diverging from the shaft axis 402. The cylindrical shaped housing has a thickness of approximately 0.025 inch at the thinnest section, and the thickness at the widest portions is able to be varied as a matter of design constraints.

The guide mechanism 600 includes a soliton conversion region 612. An example of a soliton conversion region 612 is a physical aperture that shapes the soliton propagation. For example, the magnetic field lines generated by the electromagnetic blades 104, 106, 108 may enter the guide mechanism 600 through the physical aperture of soliton conversion region 612. In another example, the soliton conversion region 612 may an electromagnetic aperture at certain frequencies that are defined by the values of magnetic permeability $\mu_r$, electric permittivity $\varepsilon_r$, and the conductivity values $\sigma$.

In one example the guide mechanism 600 includes fastener openings 614 and 616 that mount a first portion of the guide mechanism 600 to a second portion of the guide mechanism. In other examples, the guide mechanism 600 can be manufactured in a single mold containing the shaft 102 and the electromagnetic blades 104, 106, and 108.

The rotational rates of the blade fields of electromagnetic blades 104, 106, and 108 within the guide mechanism 600 may cause an interaction between a first blade field relaxation and a subsequent blade field that potentially creates magnetic stress within the guide mechanism 600. It has not been observable at low rotation rates and low strength magnetic fields disclosed herein, however, it is expected at higher rotation rates and higher strength magnetic fields.

Figure 7:
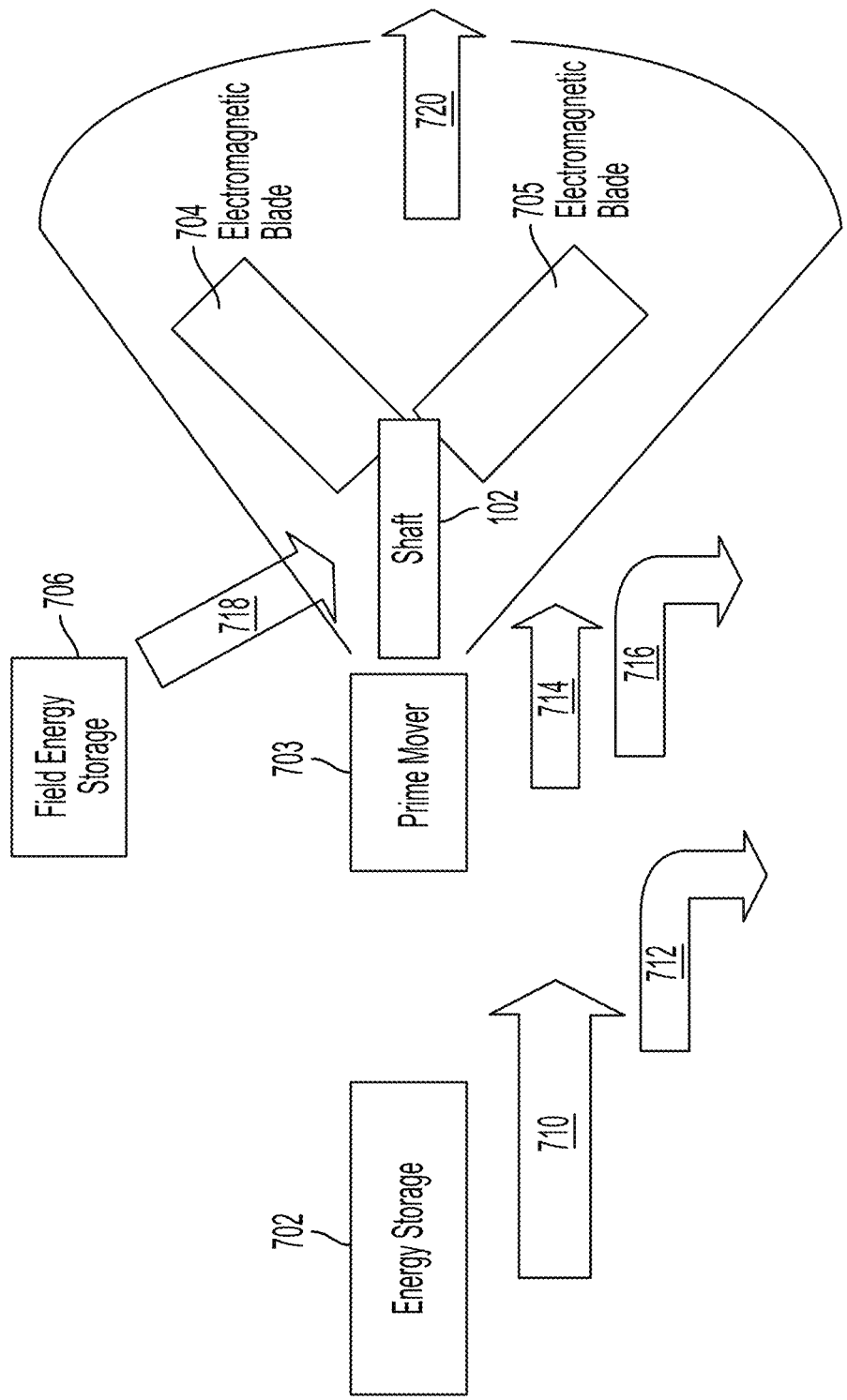
FIG. 7 depicts an example a power conversion process of the electromagnetic soliton generator system, according to aspects of the present disclosure.

FIG. 7 depicts an example a power conversion process of the electromagnetic soliton generator system, according to the present disclosure. The electromagnetic soliton generator system 100 converts potential energy into kinetic energy. The electromagnetic soliton generator system 100 includes an energy storage system 702 connected to a prime mover 703.

In an example, the energy storage 702 is a battery such as a Li-Ion battery. In other examples, the energy storage 702 could be a lead acid battery, fuel tanks such as cryogenic, hydrogen, or coal storage. Additionally, or alternatively the energy storage 702 could be a nuclear reactor, or a fusion reactor. The energy storage 702 is connected to the prime mover 703 via the Rankine cycle or direct or electromagnetic electrical connection. Examples of the prime mover 703 are an electric motor, a steam turbine, or a cryogenic turbine. The prime mover is connected to electromagnetic blade 704 and electromagnetic blade 705 via the shaft 102 (not shown) as described regarding FIGS. 1 and 2. In some examples, the electromagnetic soliton generator system 100 includes a field energy storage 703. An example of field energy storage 706 is the energy stored in the permanent magnetic fields of the electromagnetic blades 704 and 706.

As illustrated in FIG. 7, the electromagnetic soliton generator system 100 converts stored energy (e.g., total potential energy) to electromagnetic energy (e.g., total kinetic or emitted energy) as described herein next. The electromagnetic soliton generator system 100 draws stored energy 710 from the energy storage 702. The electromagnetic soliton generator system 100 provides the stored energy 710 to the prime mover 703 excluding a thermal energy loss component 712. The prime mover 703 converts the remaining stored energy 710 to rotational motion 714 (e.g., rotational kinetic energy) of the shall 102. The prime mover 703 applies rotational motion 714 to the shaft 102 that is connected to the electromagnetic blade 704 and electromagnetic blade 705. The prime mover 703 applies the rotation motion 704 reduced by a loss component 716 (e.g., mechanical, thermal, and frictional loss). The prime mover 703 applies the remainder of rotational motion 704 via the shaft 102 to the electromagnetic blade 704 and the electromagnetic blade 705. The field energy storage 706 provides additional energy input to the electromagnetic blade 704 and the electromagnetic blade 705 due to the field energy of each electromagnetic blade.

In an example with the field energy storage 706 providing additional energy inputs to an electromagnetic blade with a solenoid configuration, the field energy storage 706 provides the additional energy input via wires connect into the shaft and subsequently form a solenoid an electromagnetic blade.

The electromagnetic soliton generator system 100 converts stored energy 710 into soliton energy 720. The electromagnetic soliton generator system 100 outputs soliton energy 720. An example of soliton energy 720 is electromagnetic energy transmitted on a soliton waveform.

Figure 8:
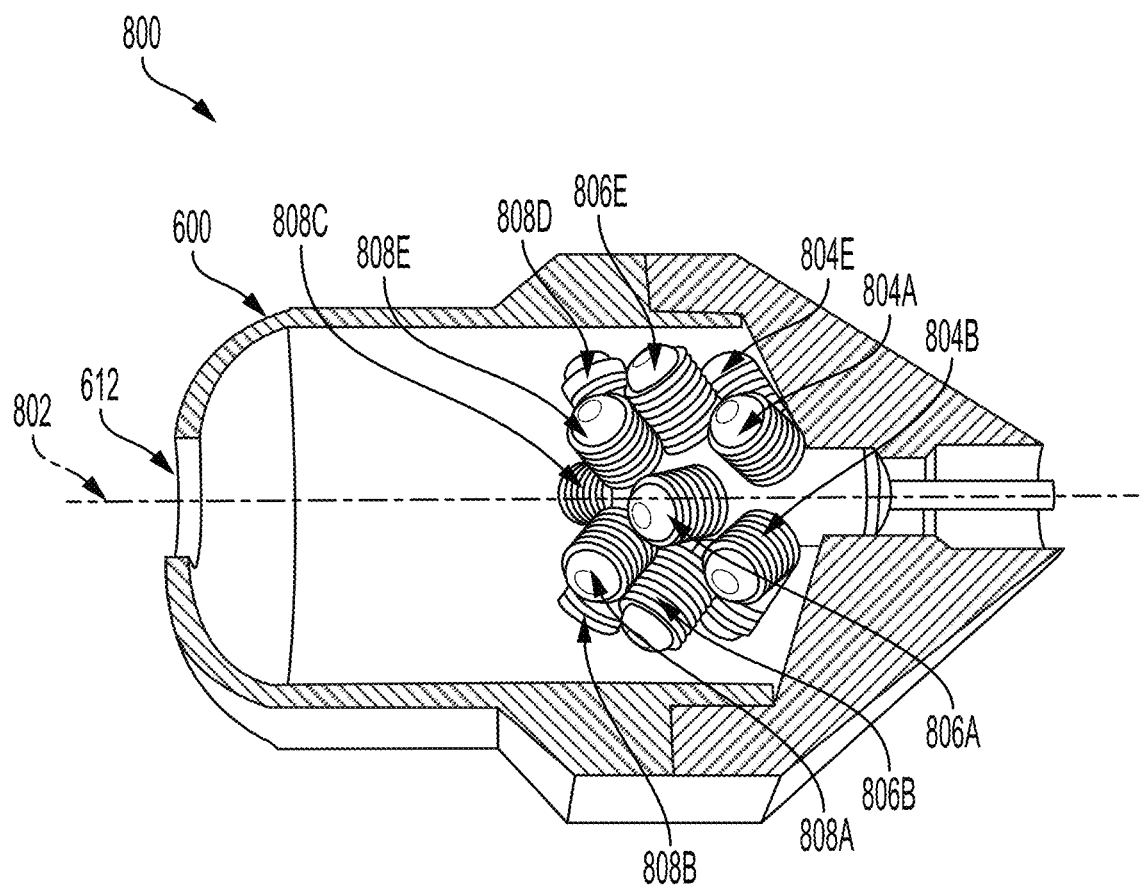
FIG. 8 depicts an example of an electromagnetic soliton generator system with a guide mechanism, according to aspects of the present disclosure.

FIG. 8 depicts an example of an electromagnetic soliton generator system with a guide mechanism, according to the present disclosure. For instance, the electromagnetic soliton generator system 800 has a shaft 802, and various rows of electromagnetic blades 804A-E (804C-804D are behind shaft 802). 806A-E (806C-806D are behind shaft 802), and 808A-808E, hereinafter "electromagnetic blades 804, 806, and 808". For example, the magnetic field lines generated by the electromagnetic blades 804, 806, 808 may enter the guide mechanism 600 through the physical aperture of soliton conversion region 612. In another example, the soliton conversion region 612 may an electromagnetic aperture at certain frequencies that are defined by the values of magnetic permeability $\varepsilon_r$, electric permittivity $\varepsilon_r$, and the conductivity values cr.

Figure 9:
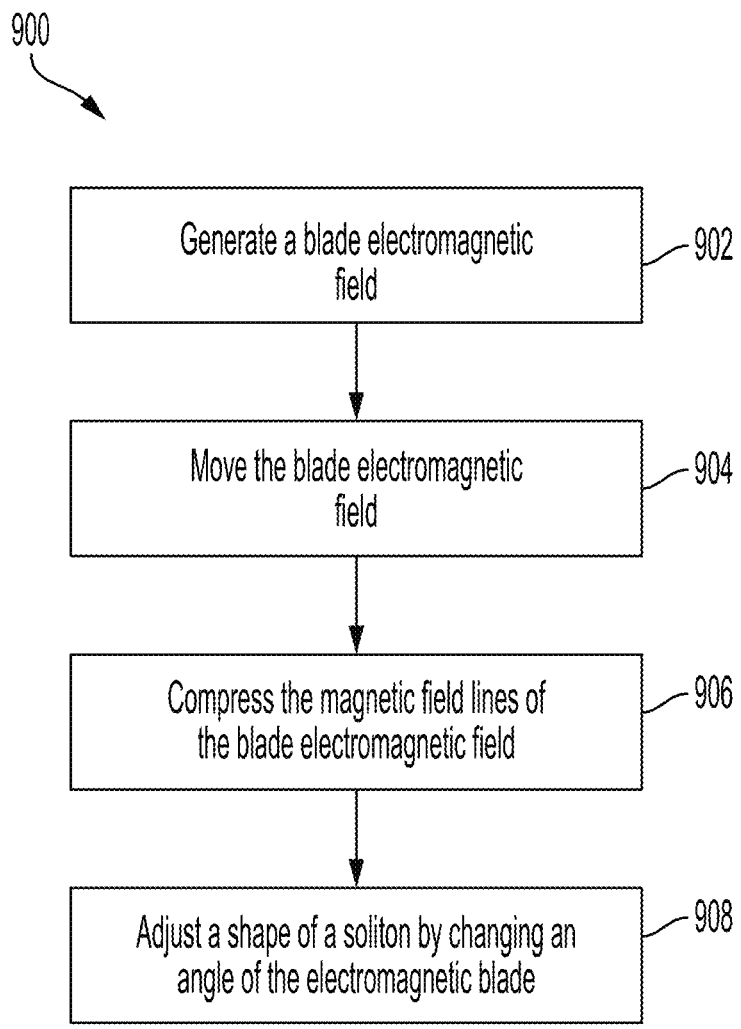
FIG. 9 depicts a process of generating an electromagnetic soliton, according to aspects of the present disclosure.

FIG. 9 depicts an example of a process of generating an electromagnetic soliton, according to the present disclosure.

At block 902, the process 900 involves generating a blade electromagnetic field. For example, an electromagnetic soliton generator has two or more electromagnetic blades. The electromagnetic blades may be magnetized neodymium (or other ferromagnetic material), or an electromagnetic solenoid. In one example, each electromagnetic blade may have multiple Neodymium ring magnets surrounding a core. Each of the electromagnetic blades creates a field based on field arrangements of each neodymium ring magnets or the configuration of the electromagnetic solenoid.

At block 904, the process 900 involves moving the blade electromagnetic field. For example, the electromagnetic blades may be attached to the shaft of the electromagnetic soliton generator system 100, The electromagnetic soliton generator system 100 may rotate the shaft and move the electromagnetic blades from an initial position to a subsequent position. Due to the movement of the electromagnetic blades, the blade electromagnetic fields are moved a corresponding distance according to magnetic principles.

At block 906, the process 900 involves compressing the magnetic field lines of the blade electromagnetic field. For example, the electromagnetic soliton generator system 100 may rotate the shaft at a speed as described herein. The movement of the electromagnetic blades corresponding to the rotation of the shaft causes the electromagnetic field lines of each blade magnetic field to compress as the electromagnetic fields respond to the new positions of the electromagnetic blades. The electromagnetic field lines compress in a relation to the distance from the electromagnetic blade.

At block 908 the process 900 involves adjusting a shape of a soliton by changing an angle of the electromagnetic blade. For instance, the electromagnetic soliton generator system can shape the soliton b changing an angle of the electromagnetic blade. The electromagnetic soliton generator system may include a control system such as electrical, hydraulic, or mechanical to move the electromagnetic blades. The electromagnetic soliton generator system may set the angle of the electromagnetic blades to achieve a specific shape of the soliton, change the magnetic anisotropy, or optimize the shape of the soliton.

Mathematical Computations

In the process of analyzing power conversion related to the electromagnetic soliton generator system 100, the following computations can be performed to understand the relationship between the electromagnetic soliton generator system 100 and the ambient environment (blackbody radiation particles).

Drawing from the physics equation for frequency, $\lambda f = c$ the speed of light is a product of wavelength and frequency. Since the electromagnetic soliton generator system 100 deals with two bodies (e.g., the electromagnetic soliton generator system 100 and the ambient radiation, or a single EM blade and a single particle of radiation), they will be labeled with subscripts 1 and 2, respectively. Due to the differences in material composition/transmission media type, there is a need to define the $c_1$ as the average electromagnetic propagation rate through the defined body. Thus, the respective frequency equations are $\lambda_1 f_1 = c_1$ and $\lambda_2 f_2 = c_2$. Applying using Einstein's relationship between energy, mass, and the propagation rate of electromagnetic waves $E=mc^2$ and Newton's Law Gravitation $$F = G\frac{m_1 m_2}{r^2},$$

body masses for the two bodies can be substituted with total system energies and propagation rates and the resulting relationship can be represented by the equation $$F = G\frac{E_1 E_2}{c_1^2 c_2^2 r^2}.$$

In order to provide comparisons between the gravitational force and translate to accelerations in the mass and magnetic pressure domains, the side by side formulations are shown to be equivalent to the Newtonian definition previously stated. For explanatory purposes, the first body is assumed to be stationary. According, the force of the second body can be computed as $F=m_2 a_2$ and the force from magnetic pressure can be represented by the equation $$F = \frac{AB^2(t)}{2\mu_0}.$$

The force on the second body can be represented by Newton's gravitational constant multiplied by the term $$\frac{E_1 E_2}{c_1^2 (c_2 r)^2}$$

that represents the total energy of the first body multiplied by the total energy of the second body, the product divided by the product of the average electromagnetic propagation rate of the first body and the average electromagnetic propagation rate through the second body. The force equation thus can be represented by $$m_2 a_2 = G\frac{E_1 E_2}{c_1^2 (c_2 r)^2}.$$

Accordingly, the force from magnetic pressure of the first body, on the second body can be represented by $$\frac{AB^2(t)}{2\mu_0} = G\frac{E_1 E_2}{c_1^2 (c_2 r)^2}.$$

Then, by rearranging terms algebraically and separating the two bodies, the force equation becomes $$\frac{E_2}{m_2 a_2 (\lambda_2 f_2 r)^2} = \frac{c_1^2}{E_1 G}$$

and the three of magnetic pressure equation can be represented by $$\frac{2\mu_0 E_2}{AB^2(t)(\lambda_2 f_2 r)^2} = \frac{c_1^2}{E_1 G}.$$

To represent the acceleration in terms of magnetic field strength and area, the terms of $$\frac{E_2}{m_2 a_2 (\lambda_2 f_2 r)^2} \text{ and } \frac{2\mu_0 E_2}{AB^2(t)(\lambda_2 f_2 r)^2}$$

reducing the terms by eliminating common terms, the resulting relationship is represented by $$a_2 = \frac{AB^2(t)}{2\mu_0 m_2}.$$

The present disclosure represents the force in terms of energy flow. The resulting relationship can be expressed by $$\frac{E_2}{B^2(t)\lambda_2^2 A(f_2 r)^2} = \frac{c_1^2}{2\mu_0 E_1 G}.$$

The total energy of the second body may be represented as a sum of a kinetic energy term and an energy density flow rate per length, such as $$E_2 = \frac{1}{2}m_2 v_2^2 + \frac{m_2 Q}{2r}.$$

In a static example with both bodies are stationary, $v_2$ is equal to zero, and thus, the energy $E_2$ is equal to a shape of energy flow $Q/r$. An edge case using the Limit Theorem illustrates that as distance r decreases, the shape of energy flow $$\lim_{r \to 0} \frac{Q}{r} = \infty.$$

As the shape of energy flow $Q/r$ changes, the directionality of the shape of energy flow results in a transition of energy to $v_2$.

Q is thus postulated as able to be defined by EM radiation across the entire spectrum according to a local density probability function. Recall from equation (10) that mass could be defined in terms of magnetic field, area, and unit acceleration. That will not be done here, but this is celebrated notably in the change in definition of the kilogram. [ref] In fact, quantifiable methods for discovering the frequency component bundling of Q/r have been in progress across the different branches of natural philosophy for generations. It was not intended, but there is a familiarity between the top portion of this equation for the students of Daniel Bernoulli. Therefore, the present discussion moves to the energy flow shape, Shape of Energy Flow Finding basis in the computations described previously, a shape function that allows for interaction of a specified amount of total energy would result in a velocity response. The frequency content of these interactions defines the observable nature of the response, and the application of the calculus modifies the actual cyclical interactions to a perfectly smooth function. By another way of stating frequency content, the total local EM radiation probability density function is referenced.

Conventionally, the electromagnetic energy described by the north-south field lines show the potential flow of charge, and typically positive to negative. Actualized flow of charge requires a second component, that is, an independent electrical component. Many investigations and engineering or industrial applications have involved the interaction of the charge with the field, and this is well-characterized. What has not been researched or manifested to date is a broad spectrum shaping, of the magnetic field such that energy conservation across a spectrum can be utilized to shape the total energy flow direction. Various experimental configurations to determine range of shape flow mechanisms led the unique shaping of an anisotropic soliton arrangement.

General Considerations

The electromagnetic blade material, the number and arrangement of electromagnetic blades, guide mechanism composition and shape, rotational speeds, and field strengths and densities are exemplary. Other implementations may use different values, numbers, or arrangements and may use other types of materials. The electromagnetic soliton generation system may be any type of generator system that forms an electromagnetic soliton.

The electromagnetic soliton generator system may include a control system including various computing devices, measurement devices and methods, and systems to provide discrete control of the pitch angle, speed of rotation, or magnetic field strengths.

The use of "adapted to," or "configured to" herein is meant as open inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

What is claimed is:

1. A method of manufacturing an electromagnetic soliton generator system, the method comprising:
    forming a shaft with a longitudinal axis;
    connecting two or more electromagnetic blades to the shaft, each electromagnetic blade of the two or more electromagnetic blades having a shaft end and a distal end;
    setting a blade electromagnetic field strength for each electromagnetic blade of the two or more electromagnetic blades,
    wherein each electromagnetic blade of the two or more electromagnetic blades has a blade electromagnetic field that is oriented with a common pole at the shaft end; and
    coupling the shaft to a prime mover.

2. The method of manufacture of claim 1, wherein the two or more electromagnetic blades comprise magnetized Neodymium.

3. The method of manufacture of claim 1, wherein each electromagnetic blade of the two or more electromagnetic blades comprise a solenoid.

* * * * *